US012652481B2

(12) United States Patent
Froß et al.

(10) Patent No.: US 12,652,481 B2
(45) Date of Patent: Jun. 9, 2026

(54) METHOD FOR ALIGNING AND/OR SYNCHRONISING METER VALUES OF AT LEAST TWO DEVICES, DEVICE, AND ARRANGEMENT OF DEVICES

(71) Applicant: Pinpoint GmbH, Chemnitz (DE)

(72) Inventors: Daniel Froß, Chemnitz (DE); Marko Rößler, Chemnitz (DE); Thomas Graichen, Chemnitz (DE); Ulrich Heinkel, Buckenhof (DE)

(73) Assignee: Pinpoint GmbH, Chemnitz (DE)

( * ) Notice: Subject to any disclaimer, the term of this patent is extended or adjusted under 35 U.S.C. 154(b) by 42 days.

(21) Appl. No.: 18/557,279

(22) PCT Filed: Apr. 21, 2022

(86) PCT No.: PCT/EP2022/060605
§ 371 (c)(1),
(2) Date: Sep. 19, 2024

(87) PCT Pub. No.: WO2022/229003
PCT Pub. Date: Nov. 3, 2022

(65) Prior Publication Data
US 2025/0193560 A1      Jun. 12, 2025

(30) Foreign Application Priority Data

Apr. 29, 2021    (DE) ..................... 10 2021 111 071.8

(51) Int. Cl.
H04Q 9/04          (2006.01)
H04L 7/00          (2006.01)
(52) U.S. Cl.
CPC ............. H04Q 9/04 (2013.01); H04L 7/0008 (2013.01); H04Q 2209/845 (2013.01)

(58) Field of Classification Search
CPC ...... H04Q 9/04; H04Q 2209/845; H04Q 9/00; H04L 7/0008; H04L 1/20; H04L 7/0037;
(Continued)

(56) References Cited

U.S. PATENT DOCUMENTS 6,748,039 B1 * 6/2004 Bates ..................... H04L 7/005
                                                   713/400
2017/0331670 A1 * 11/2017 Parkvall ............. H04W 52/028
(Continued)

FOREIGN PATENT DOCUMENTS

DE      102014226400         7/2017
DE      102014226400 B4 *   7/2017   ............... H04Q 9/04
(Continued)

OTHER PUBLICATIONS

International Preliminary Report on Patentability received for PCT Patent Application No. PCT/EP2022/060605, mailed on Nov. 9, 2023, 16 pages (8 pages of English Translation and 8 pages of Original Document).
(Continued)

*Primary Examiner* — Amine Benlagsir
(74) *Attorney, Agent, or Firm* — Workman Nydegger

(57)          ABSTRACT

The invention relates to a method for aligning and/or synchronizing counter values of at least two devices, wherein a receive facility of a first device at receive times forwards reference counter values of at least a second device, in particular of a reference counter of the second device, to a counter-value alignment unit of the first device, wherein a counter facility of the first device transfers a receive counter value to the counter-value alignment unit at each of the receive times, wherein, for the purpose of aligning the counter values, the counter-value alignment unit assigns the,
(Continued)

or at least one, reference counter value to the receive counter value at each of the receive times, and relates to a device and to an arrangement.

20 Claims, 3 Drawing Sheets

(58) Field of Classification Search
CPC .......................... H04L 7/0075; H04W 56/0015; H04W 64/00; H04J 3/0638
See application file for complete search history.

(56) References Cited

U.S. PATENT DOCUMENTS

| | | | |
|---|---|---|---|
| 2018/0039485 A1* | 2/2018 | Wilber | G06F 7/588 |
| 2019/0053173 A1* | 2/2019 | Thong | H04W 56/001 |
| 2019/0362108 A1* | 11/2019 | Haggag | H04W 4/70 |
| 2020/0099382 A1 | 3/2020 | Mautner et al. | |

FOREIGN PATENT DOCUMENTS

| | | | |
|---|---|---|---|
| DE | 102019112356 | 11/2020 | |
| JP | 2007259017 | 10/2007 | |
| JP | 2007259017 A * | 10/2007 | H04W 4/02 |

OTHER PUBLICATIONS

International Search Report and Written Opinion received for PCT Patent Application No. PCT/EP2022/060605, mailed on Aug. 19, 2022, 18 pages (9 pages of English Translation and 9 pages of Original Document).
International Search Report and Written Opinion for PCT/EP2022/060605 mailed Aug. 19, 2022.

* cited by examiner

FIG 2

METHOD FOR ALIGNING AND/OR SYNCHRONISING METER VALUES OF AT LEAST TWO DEVICES, DEVICE, AND ARRANGEMENT OF DEVICES

CROSS-REFERENCE TO RELATED APPLICATIONS

The present invention is a 35 U.S.C. § 371 U.S. National Stage of PCT Application No. PCT/EP2022/060605, filed on Apr. 21, 2022, which claims priority to German 102021111071.8, filed on Apr. 29, 2021. The entire content of each of the aforementioned patent applications is incorporated herein by reference.

BACKGROUND OF THE INVENTION

1. Field of the Invention

The invention relates to a method for aligning and/or synchronizing counter values of at least two, in particular distributed, devices, to a device, and to an arrangement.

2. The Relevant Technology

Internet of Things ("IoT") applications and/or applications in which devices communicate with one another directly and independently can be implemented on physically distributed devices. For example, sensor modules that communicate wirelessly or via cable connections form a distributed sensor network or a distributed system.

Depending on the usage, high-precision time-synchronization of the devices is required if a measurement, control or communication action is performed jointly using the sensors of such a distributed system.

BRIEF SUMMARY OF THE INVENTION

Therefore the object of the invention is to provide a method for aligning and/or synchronizing counter values of spatially distributed, in particular mobile and non-mobile, devices, and devices, in particular for providing a high-precision shared/synchronized timebase for the devices in the millisecond range, microsecond range or nanosecond range, for instance in order to carry out by means of synchronized counter values, on the basis of different receive times of signals, localizations for performing location-dependent control actions, to synchronize in time transmit and/or receive times of spatially distributed devices, and/or to synchronize channel accesses by spatially distributed network nodes in a data network.

Methods, devices and arrangements suitable for achieving this object according to the invention are defined in particular in the claims, which are directed at a method for aligning and/or synchronizing counter values, in particular having the features of independent claim 1, and at a device and an arrangement.

The respective dependent claims contain further embodiments and developments according to the invention.

The claimable feature combinations and subject matter according to the invention are not restricted to the chosen wording and the chosen dependency references of the claims. Instead, each feature of a claim category, for example of a method, can also be claimed in another claim category, for example of an apparatus.

Furthermore, any feature in the claims, irrespective of their dependency references, can be claimed in any combination with one or more other feature(s) in the claims. In addition, any feature that is described or disclosed in the description or drawing can be claimed in its own right, independent of, or detached from, the context in which it stands, alone or in any combination with one or more other features described or disclosed in the claims or in the description or drawing.

The invention is based on the finding that using conventional methods and devices, the devices involved cannot be aligned sufficiently to implement the tasks requiring sufficient synchronization.

The method according to the invention is provided for aligning and/or synchronizing counter values of at least two devices, wherein a receive facility of a first device at receive times forwards reference counter values of at least a second device, in particular of a reference counter of the second device, to a counter-value alignment unit of the first device, wherein a counter facility of the first device transfers a receive counter value to the counter-value alignment unit at each of the receive times, wherein, for the purpose of aligning the counter values, the counter-value alignment unit assigns the, or at least one, reference counter value to the receive counter value at each of the receive times.

In an embodiment, the reference counter is a virtual counter. In an embodiment, the reference counter does not comprise a physical counter facility of the device but is ascertained, calculated and/or updated by an alignment in the, or each, device, and/or is provided as a virtual software counter in a counter memory unit of the, or each, device.

In an embodiment, each device manages, or a plurality of devices manage, a virtual reference counter of this type, which is aligned both with the reference counters of the other devices and with counter values of the counter facility formed physically on the device. In particular by continuous or periodic mutual alignment of the devices, the reference counters of all the devices converge preferably to uniform values, particularly preferably including a specified tolerance band. In an embodiment, preferably distributed synchronization is thereby provided.

A plurality of, or all, time-synchronized actions of the devices, in particular sending the correction data streams and/or synchronization signals, are preferably performed on the basis of these virtual counters or reference counters distributed on the devices.

For this purpose, the output unit of a device preferably determines the transmit or output times for the sending, wherein the current reference counter value is read from the counter memory unit, and the next transmit time is ascertained in accordance with a specified protocol, in particular a channel access protocol.

In order to determine this, or each, transmit time, the output unit preferably sets a transmit time by means of a local counter unit or receive counter unit required or used for controlling the transmit unit, after which time is reached, the transmit unit sends a correction data packet containing the reference counter value as the data element or payload.

The counter-value alignment unit assigning the, or at least one, reference counter value to the receive counter value at each of the receive times for the purpose of aligning the counter values means, in particular, that a reference counter value can be ascertained each time from a receive counter value as the counter value locally available on the device containing the receive counter unit. The counting rate of the associated counter unit, in particular of the reference counter unit, is now preferably known, so that a correspondingly ascertained reference counter value can also be assigned to a future receive counter value.

Conversely, for example, a receive counter value is preferably also assigned to a determined reference counter value, so that on the basis of a reference counter, which is preferably shared between the devices, actions can be performed on distributed devices with high-precision synchronization, for example transmitting and/or receiving signals, in particular transmitting from a first device and receiving on a second device, on the basis of a common timebase.

In particular, the method according to the invention makes it possible, for example, to synchronize by means of a shared counter as the reference counter, in particular within a specified tolerance band, nodes of a network of devices, in particular of a mesh network, in the exchange of wireless messages and/or wired messages.

The method according to the invention in particular facilitates high-precision time-synchronization of devices so that a common timebase is available, for instance in order to be able to send and/or receive in time-synchronization signals from different devices, and/or to be able to perform distance measurements in time-synchronization, in particular indirectly from signal travel times between a first device and a second device.

The method according to the invention in particular facilitates time-synchronization of devices without the need for an additional synchronization signal from a further device. The devices preferably synchronize themselves directly with one another and/or only with one another.

The method according to the invention also allows location-dependent control actions to be executed independently of external navigation signals. This is a major advantage in particular inside buildings, because not only may highly accurate localization be required in these buildings but also signals from outside may be severely attenuated. The reliability of the system can therefore be increased significantly.

The method according to the invention is preferably a method for self-synchronization and/or self-localization of devices.

In an embodiment, the counter-value alignment unit updates from the reference counter values and receive counter values, in a counter alignment taking into account a specified counting rate, predicted values for the reference counter, in particular taking into account specified counting rates and counting ranges thereof.

In an embodiment, the counter-value alignment unit receives measured counter values from the counter facility at each of the receive times.

In an embodiment, at each of the receive times, the counter-value alignment unit receives reference counter values and/or location data extracted by the receive facility, in particular from data packets of a correction data stream, preferably from the second device.

In an embodiment, the counter-value alignment unit aligns the counts stored in a counter memory unit of the first device, in particular using the location data, and updates these counts in terms of time.

In an embodiment, the counter-value alignment unit uses at least one of the receive counter values received from the counter facility or at least one of the reference counter values received from the receive facility as a baseline quantity, with the remaining counter values being determined from data stored in the counter memory unit, in particular from counts, counting ranges and/or counting rates of the respective counters.

The device, in particular the first and/or second device or each device, preferably aligns at least one local counter value, preferably at least one receive counter value, with at least one shared counter value, preferably at least one reference counter value, from another device, thereby providing a common timebase for the devices.

In an embodiment, it is possible to use for this alignment also location data for the respective devices, which data is preferably used in ascertaining the transfer time or signal travel time between the devices and/or for aligning the counter values of the devices, in particular the receive counter values and reference counter values.

Particularly preferably, the counter-value alignment unit of the first device subtracts from, or adds to, the received counter values the ascertained transfer time or signal travel time, in particular ascertained from the location data, or the counter values corresponding thereto, in particular of the second and/or third device. This is particularly advantageous for the alignment of the devices in the nanosecond range, because this can achieve particularly precise synchronization.

Particularly preferably, the ascertained transfer time or signal travel time, in particular ascertained from the location data, or the counter values corresponding thereto is/are added to the received counter values if the received counter values are received reference counter values, in particular of the second and/or third device, at the transmit time, in order to correct the reference counter values to the receive time, in particular of the first device, before they are aligned with the receive counter value, in particular of the first device.

Particularly preferably, the ascertained transfer time or signal travel time, in particular ascertained from the location data, or the counter values corresponding thereto is/are subtracted from the received counter values if the received counter values are receive counter values, in particular of the first device and/or actuated at receive times or by receive events of the data stream(s) from the second and/or third device, in order to correct the receive counter values to the transmit time(s), in particular of the second and/or third device, before they are aligned with the received reference counter values, in particular of the second and/or third device.

A signal travel time shall preferably be understood to mean the difference in the counter values for the travel or transfer of a signal, in particular of a counter value or reference counter value from a first to a second device.

In an embodiment, in a value alignment, a measured-value update unit corrects predicted values for the at least one reference counter by the reference counter values.

In an embodiment, the updated and corrected predicted values are transferred to, and stored in, the counter memory unit.

In an embodiment, the measured-value update unit receives the receive counter values from the counter facility at the receive times.

In an embodiment, the measured-value update unit receives the reference counter values extracted by the receive facility at the receive times.

In an embodiment, in a correction alignment, the, or a, measured-value update unit corrects and aligns the counts determined in the counter memory unit by the counter-value alignment unit with the receive counter values coming from the counter facility and with the reference counter values coming from the receive facility.

In an embodiment, one or more counting rates are preferably corrected in the correction alignment.

In an embodiment, the first device and/or the second device or each device comprises a transmit facility.

In an embodiment, the transmit facility generates data packets from data to be transmitted which contain counts.

In an embodiment, the transmit facility transmits data packets at defined counter values of the counter facility, which counter values are ascertained in the control unit.

In an embodiment, the transmit facility transmits the data stream to at least one other device.

In particular, the transmit facility generates and/or transmits the reference counter values or a correction data stream, preferably containing the reference counter values and/or location data for the device.

In an embodiment, the receive facility receives the reference counter values from at least one data stream at least from the second device.

In an embodiment, the receive facility extracts the reference counter values from data packets of at least one data stream or a plurality of data streams from the second device.

In an embodiment, the receive facility annotates data packets when received with at least one receive counter value of the counter facility.

In an embodiment, the receive facility extracts the data from the data packets which contain shared reference counts of other devices.

In an embodiment, the data packets contain in particular quality measures and other payload or correction data at least from the second device.

In an embodiment, the counter facility comprises one or more counters having a preferably variable counting range and which provide the receive counter values, said receive counter values serving in particular as the local time references of the device.

In an embodiment, the counter facility increments one or more counters by a local clock generator, in particular by means of at least one crystal-stabilized oscillator.

In an embodiment, the counter facility comprises at least two counters, which have different counting ranges and/or counting rates, and/or work with different clock generators having different clock accuracies.

In an embodiment, reference counters that tally through mutual alignment, and/or a shared counter, are formed or embodied, in particular as a common timebase, in the counter memory unit of the first device and in the counter memory unit of the second device.

In particular, a counter value corresponds to a time instant and/or to a time value. The time instant and/or the time value is preferably obtained from the counter value by a recalculation, in particular from a specified start time and a specified counting rate.

A counting rate is in particular the time interval between two, in particular consecutive, counter values. A start time is in particular the time instant for a specified counter value, preferably for the counter value 0 (zero).

In an embodiment, the reference counter facility is a shared counter. A shared counter is preferably a counter that is shared between the devices in order to synchronize said devices, in particular is shared by transferring the reference counter values to at least one further device.

Reference counter values can preferably also be designated as correction time values and/or as shared counter values.

In particular, the reference counter values are counter values shared by at least two devices in order to have a common counter base or timebase available on the devices.

A shared counter or a reference counter shall be understood to mean in particular a counter, the counter values of which are available on at least two devices, preferably within a specified tolerance band and/or in order to synchronize these with each other in time. A counter value, in particular a reference counter value, here preferably corresponds to a certain time instant or time value. For example, a counter value or reference counter value of 143252 could correspond to the time instant 12.02.2021, 17:11 and 29.000000 seconds.

In an embodiment, the receive counter facility forms a local counter. In particular, the receive counter facility of a device is a counter facility that is formed physically on this device and/or forms part of this device, in particular inside the, or a, housing of the device. In particular, the receive counter facility is supplied with electricity by the same, in particular device-internal, power supply unit as the other facilities of the device. This allows an efficient supply of power in particular.

In an embodiment, the counter memory unit stores mutually assigned reference counter values and receive time values of the second device and of the first device, wherein the counter memory unit stores in particular historical values and/or predicted values.

In particular, the counter memory unit of the first device stores mutually assigned reference counter values of the second device and receive time values of the first device, wherein the counter memory unit stores in particular historical values and/or predicted values.

In particular, the counter memory unit of the second device stores mutually assigned reference counter values of the first device and receive time values of the second device, wherein the counter memory unit stores in particular historical values and/or predicted values.

In an embodiment, the counter memory unit stores mutually assigned reference counter values of the second device and receive time values of the first device.

In an embodiment, the counter memory unit stores the data of the receive counter values and reference counter values acquired by the receive facility and the counter facility of the first device.

In an embodiment, the data of the counter facilities is, or comprises, the counts thereof and/or the counting rates thereof. In an embodiment, data of the counter facilities is, or comprises, quality information regarding count accuracy and/or counting rate accuracy.

The counter memory unit preferably comprises a counter-value memory unit and/or a counter-attributes memory unit.

In an embodiment, an output unit provides an output data stream from counter values stored in the counter memory unit, in particular as a first data or correction data stream or second data or correction data stream.

In an embodiment, the output unit sets transmit times for the data packets of the, or an, output data stream.

In an embodiment, the transmit times in particular are set using at least one reference counter value shared and mutually aligned between the devices.

In an embodiment, for the purpose of coordinating the time of transmission of different data streams from different devices, the transmit times are set by a channel access protocol implemented on all the devices.

In an embodiment, reference counter values and/or receive counter values are set, in particular by the output unit, for the transmit times, on the basis of which the transmit facility is time-controlled.

In an embodiment, in addition to the device-internal control of the transmit facility, the output unit outputs further control signals for device-internal and/or device-external provision of synchronization signals.

In an embodiment, a control unit comprises the counter-value update unit, the measured-value update unit and the counter memory unit for storing the counts. In an embodiment, the control unit comprises, in particular additionally, a counter selection unit, a counter-attributes memory unit and a counter-value memory unit.

In an embodiment, at least part of the control unit is formed on a microcontroller and/or on a programmable logic chip, in particular using software.

In an embodiment, the correction data stream comprises counter data of the transmitter, in particular reference counter values of the first or second device at the transmit time.

In particular, the reference counter values are forwarded as, or as part of, a correction data stream.

In an embodiment, the correction data stream contains further correction, quality and/or payload data. In an embodiment, the correction data stream comprises location data.

In an embodiment, the first series of successive receive times forms or contains a first correction data stream.

In an embodiment, the correction time values are shared counter values from the second device.

In an embodiment, the devices comprise transmit facilities, and transmit times of the devices are synchronized by means of the synchronized counter values and/or timebase in order to send and/or receive time-synchronized radio signals and/or light signals.

In an embodiment, the reference counter values in the counter memory unit of the first device tally with the reference counter values of at least the second device, in particular from the counter memory unit thereof or of the reference counter thereof, within a specified tolerance measure, in particular in the millisecond range, microsecond range or nanosecond range, so that a synchronized timebase is available for all the devices.

A tolerance measure in the millisecond range, microsecond range or nanosecond range shall be understood to mean in particular an alignment having a tolerance measure of less than one millisecond, less than one microsecond, or less than one nanosecond respectively.

In an embodiment, the reference counter values in the counter memory unit of the first device tally with the reference counter values of at least the second device within a specified tolerance measure of less than one millisecond.

In an embodiment, the reference counter values in the counter memory unit of the first device tally with the reference counter values of at least the second device within a specified tolerance measure of less than one microsecond.

In an embodiment, the reference counter values in the counter memory unit of the first device tally with the values of at least the second device within a specified tolerance measure of less than one nanosecond. For tallying in the nanosecond range, it is particularly advantageous if the position of the devices is known at the same time. This can be used to correct the influence of the signal travel times of the data streams between the devices.

For another embodiment with synchronization to milli-second/microsecond or nanosecond precision, the position of the devices is not used.

In an embodiment, the first device is synchronized with the second device by assigning a reference counter value to at least one receive counter value.

In an embodiment, the first device is synchronized with the second device by assigning a reference counter value of the second device to at least one receive counter value of the first device, and/or by assigning a reference counter value of the first device to at least one receive counter value of the second device.

In particular, the synchronization of the devices provides or generates a synchronized timebase on the devices.

Aligning and/or synchronizing counter values of at least two devices shall be understood to mean in particular aligning in time and/or synchronizing in time counter values of the at least two devices, so that preferably a synchronized timebase is generated on the devices, in particular by sharing a counter, in particular a reference counter, between the at least two devices.

In an embodiment, the devices comprise transmit facilities, and transmit times of the devices are synchronized by means of the synchronized timebase in order to send and/or receive time-synchronized transmit signals, radio signals and/or light signals.

In an embodiment, signal travel times between the devices are determined by means of the values stored in the counter memory unit, wherein distances from at least a first, in particular stationary, device to a second, in particular mobile, device are determined from the signal travel times, wherein location data for the second device is determined from the determined distances by means of, or using, location data for the first device.

In an embodiment, a device, in particular a vehicle, is controlled, navigated, activated and/or moved by means of the determined location data.

In particular, on the basis of the respective signal travel times from and/or to a first, second and/or third device, taking into account the associated location information for at least some of the devices, and transmit times and receive times with respect to the reference counter values, a first device can determine distances and/or pseudo distances to the first, second and/or third device, and then, in particular on the basis of circular interpolation, can subsequently determine the location of the first or second device.

In particular, on the basis of the associated signal travel times from at least a second and/or third device, preferably taking into account the associated location information for at least the second and/or third device, taking into account the transmit times and receive times with respect to the reference counter values, the first device can determine pseudo-distances at least to the second and/or third device.

In particular, on the basis of a difference in the signal travel times from a second and from a third device, preferably using at least one offset for the received counter values or reference counter values and/or for correcting a clock error or reference clock error, the first device can determine the location or possible locations of the first device. The possible locations can be determined in particular by a mathematical function, for instance by a hyperbola.

A clock error or reference clock error can arise in an embodiment, in particular in the case of unilateral synchronization between the first device and at least a second device and/or between the first device and at least a third device, with the result that, in an embodiment, in particular pseudo-distances can be determined, which can be composed of the real distance and a distance offset, between the first device and at least the second and/or third device respectively.

In an embodiment, the distance offset is removed, preferably in, or by, the output unit of the first device, in particular by forming the difference between pseudo-distances, in particular by forming the difference between the distances or pseudo-distances determined to the second and third device. Then, from the resultant differences in the distances, the location of the first device can be determined, for instance by means of a mathematical function, for example by a hyperbola method or hyperbola navigation, preferably using location data for the second and/or third device.

In an embodiment, the distance offset contained in the pseudo-distances is preferably ascertained in, or by, the output unit of the first device by calculation, in particular for the purpose of, or in the course of, localization, preferably by aligning successively determined distances to the first and/or second device. Distances, in particular real distances, can thereby preferably be determined from the pseudo-distances.

In the case of bilateral synchronization, distances, in particular real or actual distances from the first device to the second and/or third device, can preferably be calculated directly for the purpose of localization.

In particular, the signal travel time from the second to the first device and/or from the third device to the first device can be ascertained by unilateral synchronization, in which case, counter values from the second device and/or from the third device are preferably aligned unilaterally by the first device.

In particular, on the basis of the respective signal travel times from and to a second and/or third device, taking into account the associated location information or location data for at least some of the devices, and transmit times and receive times with respect to the reference counter values, a first device can determine distances to the second and/or third device, and then, in particular on the basis of circular interpolation, can subsequently determine the location of the first device.

In particular, the signal travel time between a first and a second device and/or between the first and the third device can be ascertained by bilateral synchronization, in which case, counter values are preferably mutually aligned between the first and the second device and/or between the first and the third device.

A "location" within the meaning of the invention shall be understood in particular as location data or location information, so for instance location coordinates. Location coordinates can be, for example, geographical coordinates, spherical coordinates or other coordinates. Localization shall accordingly be understood to mean in particular determining the location data for the associated device.

Location data within the meaning of the invention can be in particular location information or location coordinates.

In an embodiment, location information or location data for the first device is stored on a memory unit of the first device and/or on the first device, and is retrieved from the memory unit of the first device.

In an embodiment, location information or location data for the second device is retrieved from a memory unit of the second device and/or on the second device, and/or is conveyed from the second device to the first device via a correction data stream.

In an embodiment, location information or location data for the third device is retrieved from a memory unit of the third device and/or on the third device, and/or is conveyed from the third device to the first device via a correction data stream.

The invention preferably allows, by the interaction of the devices on the basis of the ascertained location information, autonomous control of a device, in particular of a vehicle, without the need for an external localization signal, for instance a GPS signal.

In an embodiment, the invention comprises the actuation of location-dependent control commands. In particular, a device can control different loads or devices according to which location data has been ascertained for the device.

For example, depending on the determined location data, at a first location a first load can be controlled, and at a second location a second load, which differs from the first, can be controlled.

Hence, for example, depending on the determined location data, a load or a device, in particular a light source, could be switched on automatically at the current location of the device, and then switched off again when the device moves away from this location by a specified distance.

The device can thus transmit at a first location a first command to a second or fourth device, and at a second location a second command to a third or fifth device, depending on the previously ascertained location.

This preferably facilitates autonomous control of devices solely on the basis of the location data ascertained by these devices themselves, without requiring the aid of external navigation signals.

In an embodiment, the counter values and/or counting rates stored in the counter memory unit are used to ascertain common reference counter values inside the devices, wherein the devices, which in particular can be in the form of a lighting facility, a transmit facility or node points of a data network, can be synchronously controlled and/or activated by means of the reference counter values.

The invention therefore preferably facilitates synchronous control and/or activation of a lighting facility, a transmit and/or receive facility or node points or channels of a radio network and/or data network, without the need for an external control signal, for instance a synchronization signal.

The devices preferably jointly form a transmit and/or receive facility. For example, a first device can form a transmit facility and a second device can form a receive facility.

Preferably, the reference counter values are used to determine transmit times for the devices in order to send in time-synchronization transmit signals from the distributed devices, in particular on different channels and/or at different access points of a mesh network or of a, in particular other, radio network and/or cable network and/or using a channel access protocol that is identical on the distributed devices.

For example, a first device can access a first transmit and/or receive channel, in particular a first radio channel, and, synchronized in time therewith, a second device can access a second transmit and/or receive channel, in particular a second radio channel.

A channel access protocol here regulates in particular the timed access to transmit and/or receive channels of a mobile radio network and/or cable network. Synchronous transmitting and/or receiving can improve in particular the quality of the transfer, because the transmitting devices can transmit and/or receive synchronously within the set time windows and/or channels.

In an embodiment, the devices are stationary or mobile devices. In an embodiment, the first device is a stationary device or a mobile device and/or the second device is a stationary device or a mobile device.

According to the invention, a first device can be a stationary device and a second device can be a mobile device, a first device can be a stationary device and a second device can be stationary device, or else a first device can be a mobile device and a second device can be a mobile device. In an embodiment, the first device is a mobile device and the second device and the third device are both stationary devices. According to the invention, localization of the first and/or second device can thus be carried out, for example.

In an embodiment, the counter facilities of the devices have different local clock generators, wherein in particular the incrementation rates and/or counting rates of the counter facilities are different between the devices.

In an embodiment, the devices are, or comprise, signal transmitters, signal receivers, transceivers, receivers, control units and/or sensors.

In an embodiment, the devices have a first operating mode, in which the, or an, alignment and/or synchronization of counter values of the devices takes place, and a second operating mode, in which the devices transmit and/or receive signals in time-synchronization.

Preferably, the first and second operating modes alternate with each other, wherein in particular whenever a first timespan comes to an end, the first operating mode can switch into the second operating mode, and whenever a second timespan comes to an end, the second operating mode can switch into the first operating mode.

Preferably, the same transmit and/or receive facilities are used in both the first and second operating modes, allowing more efficient use of the resources.

In an embodiment, the devices are node points of a data network, which node points can access different data channels, wherein accesses by the devices to the data channels are synchronized in time by means of the synchronized timebase.

The devices are preferably spatially distributed, in particular are arranged at a mutual separation of at least one meter or at a separation of at least five meters. The devices are preferably separate and/or spatially isolated devices, and/or each have a separate housing.

In particular, the first device can comprise a first electrical connection and/or supply, and the second device can comprise a second electrical connection and/or supply, which differs from the first device, so that preferably the first and second devices can draw electrical power independently of each other, in particular from one or more electricity networks.

In an embodiment, the first device has a power supply unit that differs from the second device. In particular, the first device can comprise a first mobile or stationary electrical power source, in particular a first type of battery, whereas the second device can comprise a second mobile or stationary electrical power source, in particular a second type of battery. In particular, this allows better differentiation in the supply of power and/or better matching to the respective transmit and/or receive powers and operating times.

The transfer of data and counter values between the devices can take place entirely or in part by wired means and/or wirelessly via radio signals and/or light signals.

In an embodiment, a first receive facility of a first device forwards first correction counter values from a second device to a first counter-value update unit of the first device at each receive time of a first series of successive receive times of a, in particular first, correction data stream, wherein the correction counter values are in particular first reference counter values and/or shared counter values from the second device, in particular from its counter facility.

A first counter facility of the first device preferably transfers a first receive counter value to the first counter-value alignment unit at each receive time of the first series.

Preferably, for the purpose of aligning the counter values, the first counter-value alignment unit assigns the, or at least one, first reference counter value to the first receive counter value at each of the receive times.

In an embodiment, at least a second receive facility of the second device transfers second correction counter values from the first device to a second counter-value alignment unit of the second device at second receive times of a second series of successive receive times, in particular of a second correction data stream, wherein the correction counter values are in particular second reference counter values and/or shared counter values from the first device. These correction counter values can originate from a counter unit of the first device and/or be retrieved from the counter memory unit.

In an embodiment, a counter facility of the second device transfers a second receive counter value to a counter-value alignment unit of the second device at each receive time of the second series.

Preferably, for the purpose of aligning the counter values, the second counter-value alignment unit assigns the, or at least one, second reference counter value to the second receive counter value at each of the receive times.

Two-way or bilateral synchronization of at least two devices is thereby preferably achieved. In particular, for example, the second device transmits first reference counter values to the first device, whereas the first device transmits second reference counter values to the second device. The second device hence receives feedback from the first device about how the reference counter values arrived at this device, so that mutual alignment of the devices can take place continuously.

In particular, the first and second reference counter values transmitted by the first device and the second device can relate to the same reference counters.

Preferably, at least the first device and the second device mutually align themselves with each other, in particular in order to have on the first device and the second device a common timebase for transmitting and/or exchanging data and/or signals.

The preferably mutual or bilateral synchronization allows far more precise synchronization than systems that rely solely on unilateral synchronization, because in this way, for example, effects of travel times can be clearly identified and corrected, which is not straightforward with unilateral synchronization.

The invention also relates to a device, in particular for performing a method for aligning and/or synchronizing counter values of at least two devices of the invention, having a receive facility for forwarding reference counter values of at least a second device to a counter-value alignment unit of the device at receive times, a counter facility for transferring a receive counter value to the counter-value alignment unit at each of the receive times, a counter-value alignment unit for assigning the, or at least one, reference counter value to a receive counter value at each of the receive times for the purpose of aligning the counter values.

The invention also relates to an arrangement, in particular for performing a method according to the invention, comprising:

a first device having a first receive facility for forwarding reference counter values of at least a second device to a counter-value alignment unit of the first device at receive times, a first counter facility for transferring a receive counter value to the counter-value alignment unit at each of the receive times, a first counter-value alignment unit for assigning the, or at least one, reference counter value to a receive counter value at each of the receive times for the purpose of aligning the counter values; and a second device having a second receive facility for forwarding reference counter values of the first device to a second counter-value alignment unit of the second device at receive times, a second counter facility for transferring a receive counter value to the second counter-value alignment unit at each of the receive times, a second counter-value alignment unit for assigning the, or at least one, reference counter value to a receive counter value at each of the receive times for the purpose of aligning the counter values.

The invention also relates to an arrangement, in particular for performing a method according to the invention, at least comprising:

a first device having a first receive facility for forwarding reference counter values of at least a second device and/or a third device to a counter-value alignment unit of the first device at receive times, a first counter facility for transferring a receive counter value to the counter-value alignment unit at each of the receive times, a first counter-value alignment unit for assigning the, or at least one, reference counter value to a receive counter value at each of the receive times for the purpose of aligning the counter values;

a second device having a second receive facility for forwarding reference counter values of the third device to a second counter-value alignment unit of the second device at receive times, a second counter facility for transferring a receive counter value to the second counter-value alignment unit at each of the receive times, a second counter-value alignment unit for assigning the, or at least one, reference counter value to a receive counter value at each of the receive times for the purpose of aligning the counter values; and a third device having a third receive facility for forwarding reference counter values of the second device to a third counter-value alignment unit of the third device at receive times, a third counter facility for transferring a receive counter value to the third counter-value alignment unit at each of the receive times, a third counter-value alignment unit for assigning the, or at least one, reference counter value to a receive counter value at each of the receive times for the purpose of aligning the counter values.

BRIEF DESCRIPTION OF THE DRAWINGS

The invention is explained further below by means of exemplary embodiments, with reference also made to drawings, in which:

FIG. 2 shows schematically a second embodiment of the invention and for implementing the method according to the invention.

DETAILED DESCRIPTION

Figure 1:
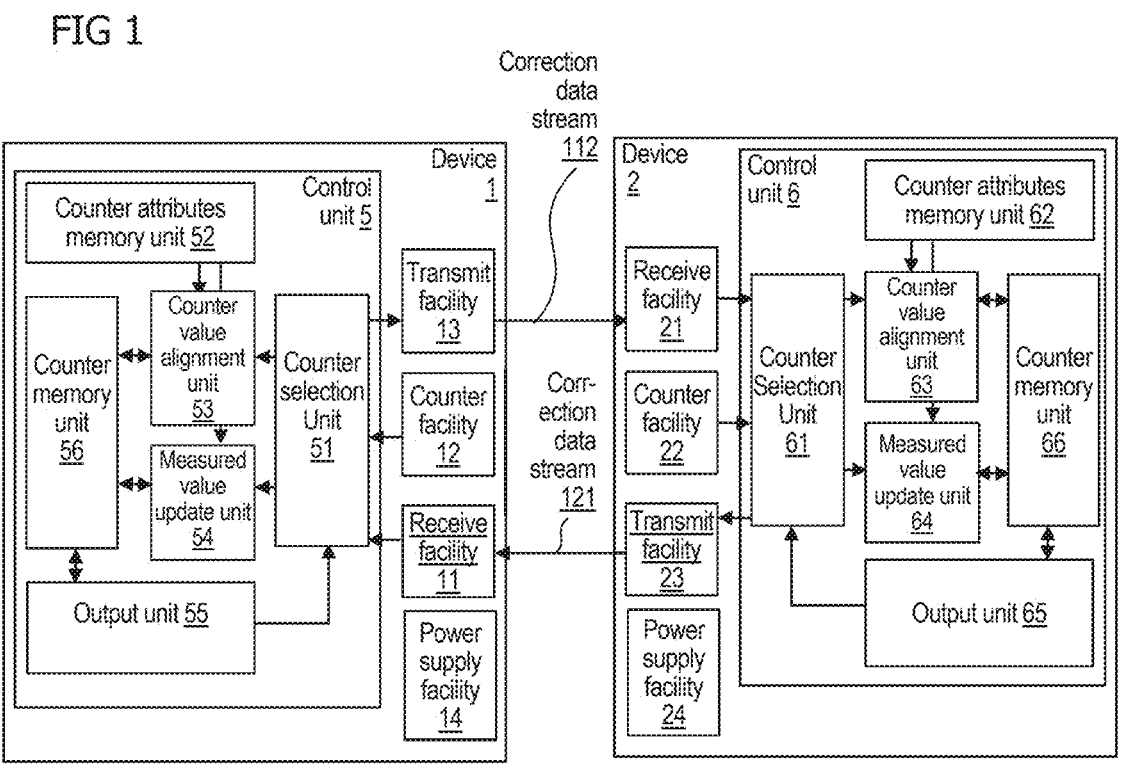
FIG. 1 shows schematically a first embodiment of the invention and for implementing the method according to the invention.
Figure 2:
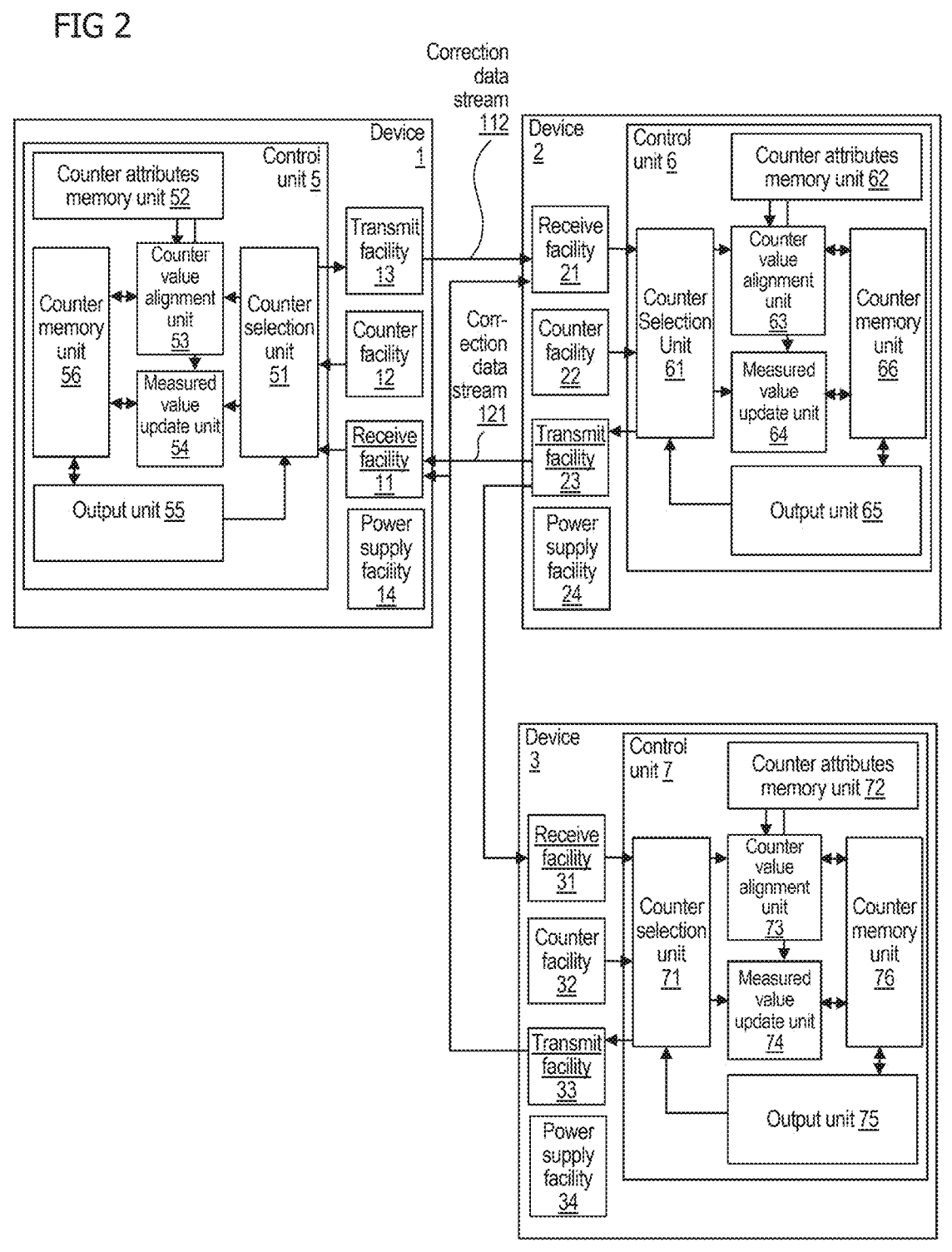
Figure 3:
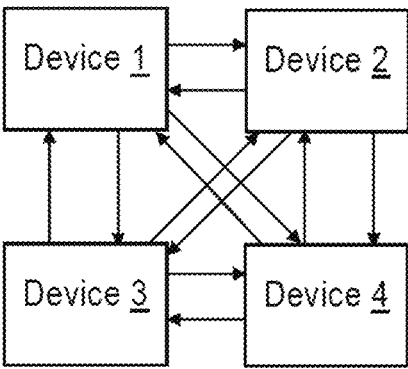
FIG. 3 shows schematically a third embodiment of the invention and for implementing the method according to the invention.

The same reference signs are used to denote corresponding parts and variables in FIGS. 1 to 3, although not all the reference signs are shown in each figure for the sake of clarity. Exemplary embodiments of the devices, arrangements and method according to the invention are explained below with reference to FIGS. 1 to 4.

FIG. 1 shows devices 1 and 2, in particular for performing a method for aligning counter values of at least two devices 1 and 2 according to the invention. The device 1 comprises a receive facility 11 for forwarding reference counter values of a second device 2 to a counter-value alignment unit 53 of the device 1 at receive times. The associated reference counter is formed in the counter-value memory unit 66 of the second device 2. The counter facility 22 forms a local counter for the receive facility 21 and the transmit facility 23.

The device 1 comprises a counter facility 12 for transferring a receive counter value to the counter-value alignment unit 53 at each of the receive times.

The device 1 comprises a counter-value alignment unit 53 for assigning the, or at least one, reference counter value to a receive counter value at each of the receive times for the purpose of aligning the counter values.

FIG. 1 also shows an arrangement, in particular for performing a method according to the invention, comprising the devices 1 and 2.

The first device 1 comprises a first receive facility 11 for forwarding reference counter values of at least a second device 2 to a counter-value alignment unit 53 of the first device 1 at receive times.

The first device 1 comprises a first counter facility 12 for transferring a receive counter value to the counter-value alignment unit 53 at each of the receive times.

The first device 1 comprises a first counter-value alignment unit 53 for assigning the, or at least one, reference counter value to a receive counter value at each of the receive times for the purpose of aligning the counter values.

The second device 2 comprises a second receive facility 21 for forwarding reference counter values from the first device 1 to a second counter-value alignment unit 63 of the second device 2 at receive times.

The second device 2 comprises a second counter facility 22 for transferring a receive counter value to the second counter-value alignment unit 63 at each of the receive times.

The second device 2 comprises a second counter-value alignment unit 63 for assigning the, or at least one, reference counter value to a receive counter value at each of the receive times for the purpose of aligning the counter values.

A first receive facility 11 of a first device 1 forwards first reference counter values from a second device 2 to a counter-value alignment unit 53 of the first device 1 at each receive time of a first series 121 of successive receive times of a correction data stream. A counter facility 12 of the first device 1 transfers a receive counter value to the counter-value alignment unit 53 at each receive time of the first series.

At least a second receive facility 21 of the second device 2 transfers second correction time values from the first device 1 to a measured-value update unit 64 of the second device 2 at each receive time of a second series of successive receive times, in particular of a second input data stream 112, wherein the correction time values are in particular shared counter values or reference values from the first device.

A counter facility 22 of the second device 2 transfers a receive counter value to a counter-value update unit 63 of the second device 2 at each receive time of the second series.

Figure 4:
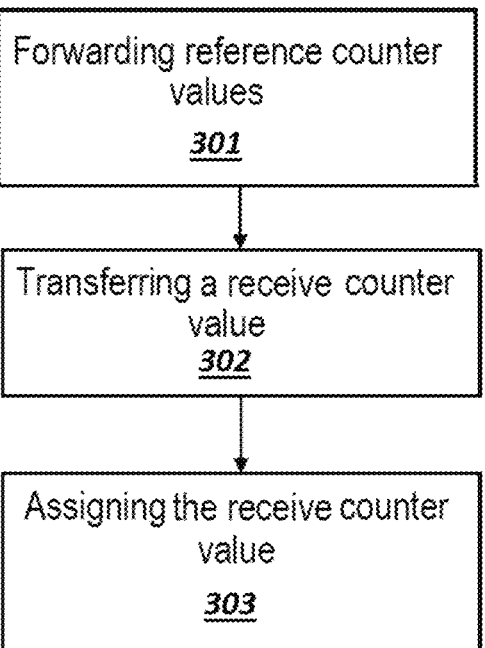
FIG. 4 shows schematically a flow diagram for implementing the method according to the invention.

As FIGS. 3 and 4 show, the invention comprises forwarding 301 reference counter values of at least a second device 2, in particular from its output unit 65, to a counter-value alignment unit 53 of the first device 1 by a receive facility 11 of the first device 1 at receive times.

The invention also comprises transferring 302 a receive counter value to the counter-value alignment unit by a counter facility of the first device 1 at each of the receive times.

In addition, the invention comprises assigning 303 the receive counter value to the at least one reference counter value by the counter-value alignment unit for the purpose of aligning the counter values at each of the receive times.

FIG. 2 shows a further arrangement, in particular for performing a method according to the invention. The arrangement comprises at least a first device 1, a second device 2 and a third device 3.

The first device 1 comprises a first receive facility 11 for forwarding counter values or reference counter values of at least a second device 2, in particular from the output unit 65 thereof, and/or counter values or reference counter values of at least a third device 3, in particular from the output unit 75 thereof, to a counter-value alignment unit 53 of the first device 1 at receive times.

The first device 1 comprises a first counter facility 12 for transferring a receive counter value to the counter-value alignment unit 53 at each of the receive times.

The first device 1 comprises a first counter-value alignment unit 53 for assigning the, or at least one, counter value or reference counter value to a receive counter value at each of the receive times for the purpose of aligning the counter values.

The second device 2 comprises a second receive facility 21 for forwarding counter values/reference counter values of the third device 3 to a second counter-value alignment unit 63 of the second device 2 at receive times.

The second device 2 comprises a second counter facility 22 for transferring a receive counter value to the second counter-value alignment unit 63 at each of the receive times.

The second device 2 comprises a second counter-value alignment unit 63 for assigning the, or at least one, reference counter value to a receive counter value at each of the receive times for the purpose of aligning the counter values.

The third device 3 comprises a third receive facility 31 for forwarding counter values or reference counter values of the second device 2, in particular from the output unit 65 thereof, to a third counter-value alignment unit 73 of the third device 3 at receive times.

The third device 3 comprises a third counter facility 32 for transferring a receive counter value to the second counter-value alignment unit 73 at each of the receive times.

The third device 3 comprises a third counter-value alignment unit 73 for assigning the, or at least one, counter value or reference counter value to a receive counter value at each of the receive times for the purpose of aligning the counter values.

FIG. 3 shows an arrangement, in particular for performing a method according to the invention, at least comprising a first device 1, a second device 2, a third device 3, and a fourth device 4.

The FIGS. 1 to 4 each show a method for aligning and/or synchronizing counter values of at least two devices 1, 2, 3, 4.

A receive facility 11 of a first device 1 forwards reference counter values of a second device 2, in particular from the output unit 65 thereof, to a counter-value alignment unit 53 of the first device 1 at receive times.

A counter facility 12 of the first device 1 transfers a receive counter value to the counter-value alignment unit 53 at each of the receive times.

For the purpose of aligning the counter values, the counter-value alignment unit 53 assigns the, or at least one, reference counter value to the receive counter value at each of the receive times The first device 1 comprises a receive facility 11, a counter facility 12, a transmit facility 13, a power supply facility 14, a counter selection unit 51, a counter-attributes memory unit 52, a counter-value alignment unit 53, a measured-value update unit 54, a counter memory unit (or: counter-value memory unit) 56, and an output unit 55.

The second device 2 comprises a receive facility 21, a counter facility 22, a transmit facility 23, a power supply facility 24, a counter selection unit 61, a counter-attributes memory unit 62, a counter-value alignment unit 63, a measured-value update unit 64, a counter-value memory unit 66, and an output unit 65.

The third device 3 comprises a receive facility 31, a counter facility 32, a transmit facility 33, a power supply facility 34, a counter selection unit 71, a counter-attributes memory unit 72, a counter-value alignment unit 73, a measured-value update unit 74, a counter-value memory unit 76, and an output unit 75.

The respective attributes of the three devices 1, 2, 3 are described below in one device for all three, with each of the devices 1, 2, 3 generally having these attributes.

The counter-value alignment unit 53, 63, 73 updates from the reference counter values and receive counter values, in a counter alignment taking into account a specified counting rate, predicted values for the reference counter, in particular taking into account specified counting rates and counting ranges thereof.

The counter-value alignment unit 53, 63, 73 receives measured counter values from the counter facility 12, 22, 32 at each of the receive times.

The counter-value alignment unit 53, 63, 73 receives at each of the receive times reference counter values extracted by the receive facility 11, 21, 31, in particular from data packets of a correction data stream.

The counter-value alignment unit 53, 63, 73 aligns in time the counts held in a counter memory unit 56 of the associated device 1, 2, 3, and updates these counts in terms of time.

The counter-value alignment unit 53, 63, 73 of the associated device 1, 2, 3 uses at least one of the receive counter values received from the counter facility 12, 22, 32 of the device, or at least one of the reference counter values received from the receive facility 11, 21, 31 of the device as a baseline quantity, with the remaining counter values being determined from data stored in the counter memory unit 56, 66, 76, in particular from counts, counting ranges and/or counting rates.

In an embodiment, the/a device, in particular the first device 1 and/or second device 2 or each device, aligns at least one local counter value, preferably at least one receive counter value, with at least one shared counter value, preferably at least one reference counter value, from another device, thereby providing a common timebase for the devices.

In an embodiment, it is possible to use for this alignment also location data for the respective devices, which data is preferably used in ascertaining the transfer time or signal travel time between the devices and/or for aligning the counter values of the devices, in particular the receive counter values and reference counter values.

In an embodiment, the counter-value alignment unit of the first device 1 subtracts from, or adds to, the received counter values the ascertained transfer time or signal travel time, in particular ascertained from the location data, or the counter values corresponding thereto, in particular of the second device 2 and/or third device 3. This is particularly advantageous for the alignment of the devices in the nanosecond range, because this can achieve particularly precise synchronization.

In an embodiment, the ascertained transfer time or signal travel time, in particular ascertained from the location data, or the counter values corresponding thereto is/are added to the received counter values if the received counter values are received reference counter values, in particular of the second device 2 and/or third device 3, at the transmit time, in order to correct the reference counter values to the receive time, in particular of the first device 1, before they are aligned with the receive counter value, in particular of the first device 1.

In an embodiment, the ascertained transfer time or signal travel time, in particular ascertained from the location data, or the counter values corresponding thereto is/are subtracted from the received counter values if the received counter values are receive counter values, in particular of the first device 1 and/or actuated at receive times or by receive events of the data stream(s) from the second device 2 and/or third device 3, in order to correct the receive counter values to the transmit time(s), in particular of the second device 2 and/or third device 3, before they are aligned with the received reference counter values, in particular of the second device 2 and/or third device 3.

A signal travel time shall preferably be understood to mean the difference in the counter values for the travel or transfer of a signal, in particular of a counter value or reference counter value from a first device 1 to a second device 2, and/or from a second device 2 to a first device 1.

In a correction alignment, a measured-value update unit 54, 64, 74 corrects by the received reference counter values predicted values for the at least one reference counter, wherein the updated and corrected predicted values are transferred to, and stored in, the counter memory unit 56, 66, 76 of the associated device.

The measured-value update unit 54, 64, 74 receives from the associated counter facility 12, 22, 32 the receive counter values at the receive times.

The measured-value update unit 54, 64, 74 receives the reference counter values extracted at the receive times by the associated receive facility 11, 21, 31.

In a correction alignment, the measured-value update unit 54, 64, 74 corrects and aligns the counts determined in the counter memory unit 56, 66, 76 by the counter-value alignment unit with the receive counter values coming from the counter facility 12, 22, 32 and with the reference counter values coming from the receive facility 11, 21, 31.

One or more counting rates are preferably corrected in the correction alignment.

The transmit facility 13, 23, 33 of the associated device 1, 2, 3 generates data packets from data to be transmitted which contain counts.

The transmit facility 13, 23, 33 transmits data packets at defined counter values of the counter facility 12, 22, 32, which counter values are ascertained in the control unit 5, 6, 7, and/or the transmit facility 13, 23, 33 transmits the data stream to at least one other device.

In an embodiment, the transmit facility 23 of the second device 2 transmits data packets at defined counter values of the counter facility 22, which counter values are ascertained in the control unit 6 of the second device 2, and/or the transmit facility 23 transmits the data stream to at least one other device, in particular to the first device 1 and/or the third device 3.

In an embodiment, the transmit facility 33 of the third device 3 transmits data packets at defined counter values of the counter facility 32, which counter values are ascertained in the control unit 7 of the third device 3, and/or the transmit facility 33 transmits the data stream to at least one other device, in particular to the first device 1 and/or the second device 2.

The receive facility 11, 21, 31 of the associated device 1, 2, 3 receives the reference counter values from at least one data stream at least from the first, second or third device 1, 2, 3.

The receive facility 11, 21, 31 extracts the reference counter values from data packets of at least one data stream or a plurality of data streams from the first, second or third device 1, 2, 3.

The receive facility 11, 21, 31 of the associated device 1, 2, 3 annotates data packets when received with the local counter value(s) of the counter facility 12, 22, 32 of the associated device 1, 2, 3.

The receive facility 11, 21, 31 extracts the data from the data packets which contain shared reference counts of other devices.

In particular, the data packets contain quality measures and other payload or correction data at least of the first device 1, second device and/or third device 2, 3.

In an embodiment, the data packets of the first device 1 contain quality measures and other payload or correction data at least of the first device 1. In an embodiment, the data packets of the second device 2 contain quality measures and other payload or correction data at least of the second device 2.

In an embodiment, the data packets of the third device 3 contain quality measures and other payload or correction data at least of the third device 3.

The counter facility 12, 22, 32 of the associated device 1, 2, 3 comprises one or more counters having a preferably variable counting range and which provide the receive counter values, said receive counter values serving in particular as the local time references of the devices 1, 2, 3.

The counter facility 12, 22, 32 increments one or more counters by a local clock generator, in particular by means of crystal-stabilized oscillators.

The counter facility 12, 22, 32 comprises at least one counter, in particular having a variable counting range and/or variable counting rate. The counter facility 12, 22, 32 can have a plurality of counters having different counting ranges, counting rates and/or clock generators, which in particular can have different clock accuracies.

The at least one reference counter and/or shared counter is formed by the counter memory unit 56, 66, 76. The counter facility 12, 22, 32 forms at least one local counter.

The counter memory unit 56, 66, 76 stores mutually assigned reference counter values and receive time values of the associated device 1, 2, 3, wherein the counter memory unit 56, 66, 76 in particular stores historical values and/or predicted values.

The counter memory unit 56, 66, 76 stores the data of the counter values acquired by the receive facility 11, 21, 31 and the counter facility 12, 22, 32 of the device 1, 2, 3, and forms the reference counter.

In particular, the data of the counters is, or comprises, the counts thereof and/or the counting rates thereof.

In particular, data of the counters is, or comprises, quality information regarding count accuracy and/or counting rate accuracy.

An output unit 55, 65, 76 provides from counter values stored in the counter memory unit 56, 66, 76 of the associated device 1, 2, 3 an output data stream, in particular as a first correction data stream or second correction data stream.

The output unit 55, 65, 76 sets transmit times for the data packets of the, or an, output data stream.

In particular, the transmit times of the devices 1, 2, 3 are set using at least one reference counter value, which is shared and mutually aligned between the devices 1, 2, 3.

For the purpose of coordinating the time of transmission of different data streams from different devices, the transmit times are set by a channel access protocol implemented on all the devices.

Reference counter values and/or receive counter values are set for the transmit times, on the basis of which the transmit facility 13, 23, 33 of the associated device 1, 2, 3 is time-controlled.

In addition to the device-internal control of the transmit facility, the output unit 55, 65, 75 outputs further control signals for device-internal and/or device-external provision of synchronization signals.

A counter selection unit 51, 61, 71 of the associated device 1, 2, 3 determines which counting facility 11, 21, 31, 12, 22, 32 of the device is to be selected in each case, and forwards the counter values to the associated counter-value alignment unit 53, 63, 73 and/or to the measured-value update unit 54, 64, 74.

In an embodiment, the counter selection unit 51, 61, 71 can forward, in addition to counter values, also location data, in particular from a data stream or correction data stream received from the first, second and/or third device 1, 2, 3, to the associated counter-value alignment unit 53, 63, 73 and/or to the measured-value update unit 54, 64, 74.

The output unit 55, 65, 75 transfers to the transmit facility 13, 23, 33 arranged in the device 1, 2, 3 for the transmit times the reference counter values for sending in the data stream, and the corresponding counter values of the counter facility 12, 22, 32 for time-control of the transmit facility 13, 23, 33.

A counter-attributes memory unit 52, 62, 72 of the associated device 1, 2, 3 forwards the counter attributes, in particular the counting rates thereof and/or counting ranges thereof, to the counter-value alignment unit 53, 63, 73 and/or to the measured-value update unit 54, 64, 74.

A control unit 5, 6, 7 of the associated device 1, 2, 3 comprises the counter-value update unit 53, 63, 73, the measured-value update unit 54, 64, 74 and the counter memory unit 56, 66, 76 for storing the counts.

At least part of each control unit 5, 6, 7 is formed on a, in particular separate, microcontroller and/or on a, in particular separate, programmable logic chip, in particular using software.

The correction data stream 112, 121 comprises counter data of the transmitting device 1, 2, 3, in particular reference counter values of the first device 1 or of the second device 2 at the transmit time.

The correction data stream 112, 121 can also contain further correction, quality and/or payload data.

The correction data stream 112, 121 can further comprise location data.

The first series of successive receive times contains, and forms, a first correction data stream 112.

The correction time values are in particular shared counter values from the second device 2.

The devices 1, 2, 3 comprise transmit facilities 13, 23, 33, and transmit times of the devices 1, 2, 3 are synchronized by means of the synchronized timebase in order to send time-synchronized radio signals and/or light signals.

The reference counter values in the counter memory unit 56, 76 tally with the values of at least the second device 2 within a specified tolerance measure, in particular in the millisecond range, microsecond range or nanosecond range, so that a synchronized timebase is available for all the devices.

For tallying in the nanosecond range, it is particularly advantageous if the position of the devices is known at the same time. This can be used to correct the influence of the signal travel times of the data streams between the devices.

For another embodiment with synchronization to millisecond/microsecond or nanosecond precision, the position of the devices is not used.

The first device 1 is synchronized with the second device 2 by assigning a reference counter value to at least one receive counter value.

The devices 1, 2, 3 comprise transmit facilities 13, 23, 33. Transmit times of the devices 1, 2, 3 are synchronized by means of the synchronized timebase in order to send time-synchronized radio signals electrical signals and/or light signals.

In an embodiment, signal travel times between the devices 1, 2 and 3 are determined by means of the values stored in the counter memory unit 56, 66, 76.

Distances from at least a first, in particular stationary, device to a second, in particular mobile, device can be determined from the signal travel times.

Location data for the second device 2 can be determined from the determined distance by means of, or using, location data for the first and/or third device 1, 3.

A device, in particular the second device 2, in particular a vehicle, can then be controlled, navigated, activated and/or moved by means of the determined location data.

In particular, on the basis of the respective signal travel times to the first device 1 and to a third device 3, taking into account the associated location information for at least some of the devices, and transmit times and receive times with respect to the reference counter values, the second device 2 can determine distances or pseudo-distances to the first and second device, and then, in particular on the basis of circular interpolation, can subsequently determine the location of the first device.

In particular, on the basis of the associated signal travel times from a second and/or third device 2, 3, preferably taking into account the associated location information for the second and/or third device, and transmit times and receive times with respect to the reference counter values, the first device 1 can determine pseudo-distances to the second and/or third device 2, 3.

In particular, on the basis of a difference in the signal travel times from a second and from a third device 2, 3, preferably using at least one offset for the received counter values or reference counter values and/or for correcting a clock error, the first device 1 can determine the location or possible locations of the first device. The possible locations can be determined in particular by a mathematical function, for instance by a hyperbola.

In particular, the signal travel time from the second device 2 to the first device 1 and/or from the third device 3 to the first device 1 can be ascertained by unilateral synchronization, in which case, counter values from the second device 2 and/or from the third device 3 are preferably aligned unilaterally by the first device 1.

In particular, on the basis of the respective signal travel times from and to a second device 2 and/or third device 3, taking into account the associated location information or location data for at least some of the devices, and transmit times and receive times with respect to the reference counter values, a first device 1 can determine distances to the second and/or third device, and then, in particular on the basis of circular interpolation, can subsequently determine the location of the first device.

In particular, the signal travel time between a first device 1 and a second device 2 and/or between the first device 1 and the third device 3 can be ascertained by bilateral synchronization, in which case, counter values are preferably mutually aligned between the first device 1 and the second device 2 and/or between the first device 1 and the third device 3.

A "location" within the meaning of the invention shall be understood in particular as location data or location information, so for instance location coordinates. Location coordinates can be, for example, geographical coordinates, spherical coordinates or other coordinates. Localization shall accordingly be understood to mean in particular determining the location data for the associated device.

The invention preferably facilitates, by the interaction of the devices 1, 2, 3 on the basis of the ascertained location information, autonomous control of a device, in particular of a vehicle, without the need for an external localization signal, for instance a GPS signal.

In an embodiment, the invention comprises the actuation of location-dependent control commands. In particular, a device 1, 2, 3 can control different further loads or devices according to which location data has been ascertained for the device 1, 2, 3.

For example, depending on the determined location data, a device 1, 2 or 3 at a first location can control a first load, and at a second location can control a second load, which differs from the first.

Hence, for example, depending on the determined location data, a load or a device, in particular a light source, could be switched on automatically at the current location of the device, and then switched off again when the device moves away from this location by a specified distance.

The device 1, 2 and 3 can thus transmit at a first location a first command to a second or fourth device, and at a second location a second command to a third or fifth device, depending on the previously ascertained location.

This preferably allows autonomous control of devices solely on the basis of the location data ascertained by these devices themselves, without requiring the aid of external navigation signals.

In an embodiment, the counter values and/or counting rates stored in the counter memory unit 56, 66, 76 are used to ascertain common reference counter values inside the devices 1, 2 3, wherein the devices, which in particular can be in the form of a lighting facility, a transmit facility or node points of a data network, can be synchronously controlled and/or activated by means of the reference counter values.

The invention therefore preferably facilitates synchronous control and/or activation of a lighting facility, of a transmit and/or receive facility, or of node points or channels of a radio network, electrical network, and/or data network, without the need for an external control signal, for instance a synchronization signal.

The devices 1, 2, 3 preferably jointly form a transmit and/or receive facility. For example, a first device can form a transmit facility and a second device can form a receive facility.

Preferably, the reference counter values are used to determine transmit times for the devices 1, 2, 3 in order to send transmit signals in time-synchronization from the distributed devices, in particular on different channels and/or at different access points of a mesh network or of a, in particular other, radio network and/or cable network and/or using a channel access protocol that is identical on the distributed devices.

For example, the first device 1 can access a first transmit and/or receive channel, in particular a first radio channel, and, synchronized in time therewith, the second device 2 can access a second transmit and/or receive channel, in particular a second radio channel.

A channel access protocol here regulates in particular the timed access to transmit and/or receive channels of a mobile radio network and/or cable network. Synchronous transmitting and/or receiving can improve in particular the quality of the transfer, because the transmitting devices can transmit and/or receive synchronously within the set time windows and/or channels.

The devices 1, 2, 3 are stationary or mobile devices. The first device 1 is a stationary device or a mobile device and/or the second device 2 is a stationary device or a mobile device.

According to the invention, the first device 1 can be a stationary device and the second device 2 can be a mobile device, the first device 1 can be a stationary device and the second device 2 can be stationary device, or else the first device 1 can be a mobile device and the second device 2 can be a mobile device. In an embodiment, the first device 1 is a mobile device and the second device 2 and the third device 3 are both stationary devices. According to the invention, localization of the first and/or second device 1, 2 can thus be carried out, for example.

The counter facilities 12, 22, 32 of the devices have different local clock generators, wherein in particular the incrementation rates and/or counting rates are different between the devices.

The devices 1, 2, 3, 4 are, or comprise, signal transmitters, signal receivers, transmitters, transceivers, receivers, control units and/or sensors.

The devices 1, 2, 3, 4 have a first operating mode, in which the, or an, alignment and/or synchronization of counter values of the devices takes place, and a second operating mode, in which the devices transmit and/or receive signals in time-synchronization.

Preferably, the first and second operating modes alternate with each other, wherein in particular whenever a first timespan comes to an end, the first operating mode can switch into the second operating mode, and whenever a second timespan comes to an end, the second operating mode can switch into the first operating mode.

Preferably, the same transmit and/or receive facilities of the devices 1, 2, 3 and, if applicable 4, are used in both the first and second operating modes, allowing more efficient use of the resources.

In an embodiment, the devices 1, 2, 3 and, if applicable 4, are node points of a data network, which node points can access different data channels, wherein accesses by the devices to the data channels are synchronized in time by means of the synchronized timebase.

The devices 1, 2, 3 and, if applicable 4, are preferably spatially distributed, in particular are arranged at a mutual separation of at least one meter or at a separation of at least five meters. The devices are preferably separate and/or spatially isolated devices, and/or each have a separate housing.

The first device 1 comprises a first electrical supply 14, and the second device 2 comprises a second electrical supply 24, which differs from the first device 1, so that preferably the first device 1 and the second device 2 can draw electrical power independently of each other, in particular from one or more electricity networks.

For example, the first device 1 has a power supply unit 24 that differs from the second device 2. In particular, the first device 1 can comprise a first mobile or stationary electrical power source, in particular a first type of battery, whereas the second device 2 can comprise a second mobile or stationary electrical power source, in particular a second type of battery. In particular, this allows better differentiation in the supply of power and/or better matching to the respective transmit and/or receive powers and operating times.

The transfer of data and counter values between the devices 1, 2, 3 and, if applicable 4, can take place entirely or in part by wired means and/or wirelessly via radio signals and/or light signals.

LIST OF REFERENCE SIGNS

1, 2, 3, 4 devices
5, 6, 7 control unit
11, 21, 31 receive facility
12, 22, 32 counter facility
13, 23, 33 transmit facility
14, 24, 34 power supply facility
51, 61, 71 counter selection unit
52, 62, 72 counter-attributes memory unit
53, 63, 73 counter-value alignment unit
54, 64, 74 measured-value update unit
55, 65, 75 output unit
56, 66, 76 counter memory unit
121, 122 correction data stream
301-303 method steps

We claim:

1. A method for aligning and/or synchronizing counter values of at least two devices, including at least a first device and a second device, wherein:

a receive facility of the first device at receive times forwards reference counter values of a reference counter of at least the second device, to a counter-value alignment unit of the first device, a counter facility of the first device transfers a receive counter value to the counter-value alignment unit at each of the receive times, for a purpose of the aligning of the counter values of at least the first and second devices, the counter-value alignment unit assigns at least one, reference counter value to the receive counter value at each of the receive times;

wherein the receive facility receives the reference counter values from at least one correction data stream of at least the second device, wherein the at least one correction data stream comprises location coordinate data for at least the second device, wherein location coordinates are used in ascertaining transfer time or signal travel time between at least the first and second devices and for the aligning of the counter values of at least the first and second devices, wherein an output unit provides, from the counter values stored in a counter memory unit of the at least first or second devices of the at least two devices, an output data stream as the at least one correction data stream, wherein the output unit sets transmit times for data packets of the output data stream, wherein the transmit times are set using the reference counter value, which is shared and mutually aligned between the at least two devices, wherein, for a purpose of coordinating a time of transmission of different data streams from different devices of the at least two devices, the output unit sets the transmit times by a channel access protocol known to the different devices, wherein first reference counter values in the counter memory unit of the first device tally with the reference counter values of the second device within a specified tolerance measure in a nanosecond range, so that a synchronized timebase is available for the at least two devices for facilitating high-precision time-synchronization.

2. The method recited in claim 1, wherein, at least one of:

the counter-value alignment unit updates from the reference counter values and the receive counter value, in a counter alignment, predicted values for the reference counter, thereby taking into account specified counting rates and counting ranges thereof, and/or the counter-value alignment unit uses at least one of: (i) the receive counter value received from the counter facility or (ii) the reference counter values received from the receive facility as a baseline quantity, with remaining of the counter values being determined from data stored in the counter memory unit of the at least first or second devices, wherein the stored data comprise counts, the counting ranges and/or the counting rates.

3. The method as recited in claim 1, wherein, at least one of:

in a value alignment, a measured-value update unit corrects by the reference counter values, predicted values for at least one of the reference counter values, wherein any updated values and the corrected predicted values are transferred to, and stored in, the counter memory unit of the at least first or second devices, in a correction alignment, the, measured-value update unit aligns and corrects counts determined in the counter memory unit of the at least first or second devices by the counter-value alignment unit with receive counter values coming from the counter facility and with the reference counter values coming from the receive facility, and/or one or more counting rates are corrected in the correction alignment.

4. The method as recited in claim 1, wherein, at least one of:

the first device and/or the second device comprises a transmit facility, the transmit facility generates the data packets from data to be transmitted which contain counts, the transmit facility transmits the data packets at defined counter values of the counter values of the counter facility, which the defined counter values are ascertained in the output unit, and/or the transmit facility transmits at least one data stream containing the defined counter values to at least one other device.

5. The method as recited in claim 1, wherein, at least one of:

the receive facility extracts the reference counter values from the data packets of at least one data stream or a plurality of data streams from the second device, the receive facility extracts data from the data packets which contain shared reference counts of other devices, and/or wherein the data packets contain quality measures and other payload or correction data from the second device.

6. The method as recited in claim 1, wherein, at least one of:

the counter facility comprises one or more counters having a variable counting range and which provide at least receive counter values, said receive counter values serving as local time references of the first device or the second device, the counter facility increments the one or more counters by local clock generators by means of crystal-stabilized oscillators, and/or the counter facility comprises at least two counters of the one or more counters, which have different counting ranges and/or counting rates, and/or work with different clock generators having different clock accuracies.

7. The method as recited in claim 1, wherein:

reference counters that tally through mutual alignment, and/or a shared counter, are formed as a common timebase, in the counter memory unit of the first device and in the counter memory unit of the second device.

8. The method as recited in claim 1, wherein, at least one of:

the counter memory unit of the first device stores mutually assigned reference counter values of the second device and receive counter values of the first device, wherein the counter memory unit of the first device in particular stores historical values and predicted values for the counter values of the first device, the counter memory unit of the at least first or second devices: (i) saves data of receive counters acquired by the receive facility and the counter facility of the first device or the second device, and/or (ii) forms the reference counter, in particular jointly with the output unit, the data of the receive counters comprises: (i) counts thereof and/or counting rates thereof, and/or (ii) quality information regarding count accuracy and/or counting rate accuracy.

9. The method as recited in claim 1, wherein, at least one of:

the output unit: (i) sets the reference counter values of the second device and/or receive counter values for the transmit times based on which a transmit facility is time-controlled, and/or (ii) in addition to a device-internal control of the transmit facility, outputs further control signals for device-internal and/or device-external provision of synchronization signals.

10. The method as recited in claim 1, wherein, at least one of:

a control unit comprises or contains the counter-value alignment unit, a measured-value update unit, and the counter memory unit of the at least first or second devices for storing counts, and also the output unit, and/or at least part of the control unit is formed on a microcontroller and/or on a programmable logic chip, in particular using software.

11. The method as recited in claim 1, wherein, at least one of:

the at least one correction data stream comprises counter data of a device, wherein the counter data comprises the first reference counter values and the reference counter values of the first device or the second device at a transmit time of the transmit times, the at least one correction data stream contains further correction, quality and/or payload data, and/or a first series of successive receive times forms a first correction data stream, and/or the first reference counter values of the first device are shared counter values of the counter values from the second device, which are aligned on the first device.

12. The method as recited in claim 1, wherein, at least one of:

the first and second devices each comprise transmit facility, and the transmit times of the first and second devices are synchronized by means of the synchronized counter values in order to send time-synchronized radio signals and/or light signals, and/or the first device is synchronized with the second device by assigning the reference counter value of the second device to the receive counter value of the first device, and/or at least the first device and the second device each comprise the transmit facility, and the transmit times of the first and second devices are synchronized by means of the synchronized counter values as a timebase in order to send the time-synchronized radio signals and/or the light signals.

13. The method as recited in claim 1, wherein:

signal travel times between the first and second devices are determined by means of the reference counter values and the first reference counter values stored in the counter memory unit of the at least first and second devices are determined from a difference in the reference counter values and the first reference counter values when a signal is sent at the first device and when the signal is received at the second device, distances from at least the first device to the second device are determined from the determined signal travel times, location data for the second device is determined from the determined distances by means of, or using, location data for the first device, a device comprising a vehicle, is controlled, navigated, activated and/or moved by means of the determined location data for the second device.

14. The method as recited in claim 1, wherein, at least one of:

the counter values stored in the counter memory unit of the first device and the second device are used to ascertain the reference counter values and the first reference counter values inside the first and second devices as a common timebase, the first and second devices can be in a form of a lighting facility or transmit facility that is formed jointly from the first and second devices, or a data network formed from the first and second devices as node points, are synchronously controlled and/or activated by means of the reference counter values and the first reference counter values, and/or in particular, the reference counter values and the first reference counter values are used to determine the transmit times in order to send time-synchronized transmit signals from distributed devices using the channel access protocol that is identical on the distributed devices.

15. The method as recited in claim 1, wherein, at least one of:

the first and second devices are stationary or mobile devices, the counter facility of the first and second devices have different local clock generators, wherein incrementation rates and/or counting rates are different between the first and second devices, and/or the first device is the stationary device or the mobile device and/or the second device is the stationary device or the mobile device, the first and second devices comprise signal transmitters, signal receivers, transceivers, receivers, control units and/or sensors, the first and second devices are node points of a data network, which the node points can access different data channels, and accesses by the first and second devices to the data channels are synchronized in time by means of the synchronized timebase.

16. The method as recited in claim 1, wherein:

the receive facility of the first device forwards first correction counter values from the second device to a first counter-value alignment unit of the first device at each receive time of a first series of the receive times of the at least one correction data stream, wherein the first correction counter values are shared counter values of the counter values and/or the reference counter values from the second device, the counter facility of the first device transfers a first receive counter value to a first counter-value alignment unit at said each receive time of the first series, at least a second receive facility of the second device transfers second correction counter values from the first device to a second counter-value update unit of the second device at each second receive time of a second series of second receive times of a second correction data stream, wherein the second correction counter values in particular comprise shared counter values of the counter values and/or the first reference counter values from the first device, and a counter facility of the second device transfers a second receive counter value to a second counter-value alignment unit of the second device at said each second receive time of the second series.

17. The method as recited in claim 1, wherein, at least one of:

in a counter alignment, a first and/or second counter-value alignment unit updates from the first reference counter values or second reference counter values and a first or second receive counter values predicted values for a first or second reference counter taking into account specified counting rates and/or specified counting ranges thereof, the first and/or second counter-value alignment unit uses one or more receive counter values received from the counter facility of the first or second devices, or at least one of the first or the second reference counter values received from a first and/or second receive facility of the first or second devices as a baseline quantity, with remaining of the counter values being determined from data stored in the counter memory unit of the first or second devices from one or more stored counts, counting ranges and/or counting rates, and/or at least the first device and the second device mutually align themselves with each other in order to have on the first device and the second device a common timebase for transmitting and/or exchanging the stored data and/or signals.

18. A device for aligning counter values of at least two devices including at least a first device and a second device, comprising:

a receive facility of the first device at receive times forwards reference counter values of a reference counter of at least the second device, to a counter-value alignment unit of the first device, a counter facility of the first device transfers a receive counter value to the counter-value alignment unit at each of the receive times, for a purpose of the aligning of the counter values of at least the first and second devices, the counter-value alignment unit assigns at least one, reference counter value to the receive counter value at each of the receive times;

wherein the receive facility receives the reference counter values from at least one correction data stream of at least the second device, wherein the at least one correction data stream comprises location coordinate data for at least the second device, wherein location coordinates are used in ascertaining transfer time or signal travel time between at least the first and second devices and for the aligning of the counter values of at least the first and second devices, wherein an output unit provides, from the counter values stored in a counter memory unit of the at least first or second devices of the at least two devices, an output data stream as the at least one correction data stream, wherein the output unit sets transmit times for data packets of the output data stream, wherein the transmit times are set using the reference counter value, which is shared and mutually aligned between the at least two devices, wherein, for a purpose of coordinating a time of transmission of different data streams from different devices of the at least two devices, the output unit sets the transmit times by a channel access protocol known to the different devices, wherein first reference counter values in the counter memory unit of the first device tally with the reference counter values of the second device within a specified tolerance measure in a nanosecond range, so that a synchronized timebase is available for the at least two devices for facilitating high-precision time-synchronization, the receive facility for forwarding the reference counter values of the reference counter of at least the second device, to the counter-value alignment unit of the first device at the receive times, the counter facility for transferring the receive counter value to the counter-value alignment unit at each of the receive times, the counter-value alignment unit for assigning the reference counter value to the receive counter value at each of the receive times for the purpose of the aligning of the counter values of at least the first and second devices.

19. A system for aligning counter values of at least two devices including at least a first device and a second device, comprising:

a receive facility of the first device at receive times forwards reference counter values of a reference counter of at least the second device, to a counter-value alignment unit of the first device, a counter facility of the first device transfers a receive counter value to the counter-value alignment unit at each of the receive times, for a purpose of the aligning of the counter values of at least the first and second devices, the counter-value alignment unit assigns at least one, reference counter value to the receive counter value at each of the receive times;

wherein the receive facility receives the reference counter values from at least one correction data stream of at least the second device, wherein the at least one correction data stream comprises location coordinate data for at least the second device, wherein location coordinates are used in ascertaining transfer time or signal travel time between at least the first and second devices and for the aligning of the counter values of at least the first and second devices, wherein an output unit provides, from the counter values stored in a counter memory unit of the at least first or second devices of the at least two devices, an output data stream as the at least one correction data stream, wherein the output unit sets transmit times for data packets of the output data stream, wherein the transmit times are set using the reference counter value, which is shared and mutually aligned between the at least two devices, wherein, for a purpose of coordinating a time of transmission of different data streams from different devices of the at least two devices, the output unit sets the transmit times by a channel access protocol known to the different devices, wherein first reference counter values in the counter memory unit of the first device tally with the reference counter values of the second device within a specified tolerance measure in a nanosecond range, so that a synchronized timebase is available for the at least two devices for facilitating high-precision time-synchronization, the first device having:

a first receive facility for forwarding the reference counter values of at least the second device to the counter-value alignment unit of the first device at the receive times, a first counter facility for transferring the receive counter value to the counter-value alignment unit at each of the receive times, a first counter-value alignment unit for assigning the reference counter value to the receive counter value at each of the receive times for the purpose of the aligning of the counter values of at least the first and second devices; and the second device having:

a second receive facility for forwarding the first reference counter values of the first device to a second counter-value alignment unit of the second device at the receive times, a second counter facility for transferring the receive counter value to the second counter-value alignment unit at each of the receive times, the second counter-value alignment unit for assigning the reference counter value to the receive counter value at each of the receive times for the purpose of the aligning of the counter values of at least the first and second devices.

20. A system for aligning counter values of at least two devices including at least a first device and a second device, comprising:

a receive facility of the first device at receive times forwards reference counter values of a reference counter of at least the second device, to a counter-value alignment unit of the first device, a counter facility of the first device transfers a receive counter value to the counter-value alignment unit at each of the receive times, for a purpose of the aligning of the counter values of at least the first and second devices, the counter-value alignment unit assigns at least one, reference counter value to the receive counter value at each of the receive times;

wherein the receive facility receives the reference counter values from at least one correction data stream of at least the second device, wherein the at least one correction data stream comprises location coordinate data for at least the second device, wherein location coordinates are used in ascertaining transfer time or signal travel time between at least the first and second devices and for the aligning of the counter values of at least the first and second devices, wherein an output unit provides, from the counter values stored in a counter memory unit of the at least first or second devices of the at least two devices, an output data stream as the at least one correction data stream, wherein the output unit sets transmit times for data packets of the output data stream, wherein the transmit times are set using the reference counter value, which is shared and mutually aligned between the at least two devices, wherein, for a purpose of coordinating a time of transmission of different data streams from different devices of the at least two devices, the output unit sets the transmit times by a channel access protocol known to the different devices, wherein first reference counter values in the counter memory unit of the first device tally with the reference counter values of the second device within a specified tolerance measure in a nanosecond range, so that a synchronized timebase is available for the at least two devices for facilitating high-precision time-synchronization, The first device having:

a first receive facility for forwarding the reference counter values of at least the second device to a first counter-value alignment unit of the first device at first receive times, a first counter facility for transferring a first receive counter value to the first counter-value alignment unit at each of the first receive times, the first counter-value alignment unit for assigning a first reference counter value to the first receive counter value at each of the first receive times for the purpose of the aligning of the counter values of at least the first and second devices;

the second device having:

a second receive facility for forwarding third reference counter values of a third device to a second counter-value alignment unit of the second device at second receive times, a second counter facility for transferring a second receive counter value to the second counter-value alignment unit at each of the second receive times, the second counter-value alignment unit for assigning a second reference counter value to the second receive counter value at each of the second receive times; and the third device having:

a third receive facility for forwarding the reference counter values of the reference counter of the second device to a third counter-value alignment unit of the third device at third receive times, a third counter facility for transferring a third receive counter value to the third counter-value alignment unit at each of the third receive times, the third counter-value alignment unit for assigning a, reference counter value to a receive counter value at each of the third receive times of the third device.

\* \* \* \* \*